July 14, 1953  J. V. DAVIS  2,645,186
LOADING AND UNLOADING APPARATUS
Filed Aug. 26, 1950  4 Sheets-Sheet 1

INVENTOR.
JOHN V. DAVIS.
BY
ATTORNEY.

July 14, 1953 J. V. DAVIS 2,645,186
LOADING AND UNLOADING APPARATUS
Filed Aug. 26, 1950 4 Sheets-Sheet 2

INVENTOR.
JOHN V. DAVIS.
BY
*Samuel Weisman*
ATTORNEY.

July 14, 1953     J. V. DAVIS     2,645,186
LOADING AND UNLOADING APPARATUS

Filed Aug. 26, 1950     4 Sheets-Sheet 3

INVENTOR.
JOHN V. DAVIS.
BY
ATTORNEY.

July 14, 1953 J. V. DAVIS 2,645,186
LOADING AND UNLOADING APPARATUS
Filed Aug. 26, 1950 4 Sheets-Sheet 4

INVENTOR.
JOHN V. DAVIS.
BY
ATTORNEY.

Patented July 14, 1953

2,645,186

UNITED STATES PATENT OFFICE 2,645,186

LOADING AND UNLOADING APPARATUS

John V. Davis, Detroit, Mich., assignor to The Udylite Corporation, Detroit, Mich., a corporation of Delaware Application August 26, 1950, Serial No. 181,650

9 Claims. (Cl. 104—97)

The present invention pertains to a novel loading and unloading apparatus used in conjunction with plating or other conveying-processing machines, as shown for example in my U. S. Patent No. 2,479,322 of August 16, 1949.

It is customary to load and unload the work at a station embodied in the machine. This station adds to the length of the machine and also adds disproportionately to the cost since the machine is built primarily for processing and costs more per foot than a mere conveyor, which is the only function of the loading and unloading station.

The loading and unloading operations at the station are manual in most cases, connecting up with separate conveyors for delivering the work from or to other parts of the plant. Another objection to this system is that the workers at the station are exposed to fumes from the processing machine.

The principal object of this invention is to overcome the stated objections and to provide a more economical system for the operations described. More particular objects are to reduce the length of the loading and unloading station in the processing machine, to transfer the work in and out of the machine mechanically, thereby eliminating the manual labor and the exposure of workers to fumes, and to enable loading and unloading of the work at remote points in the plant.

In the accomplishment of these objects, a conveyor is provided adjacent to the processing machine and preferably at a somewhat higher level. This conveyor, as well as the conveyor in the processing machine, comprises a rail with work carriers thereon and pushes for advancing the carriers. Each rail has a gap, and a common rail segment is movable mechanically from one gap to the other. Thus, when the rail segment fills the gap in the processing machine rail, a work carrier is moved thereon, and the segment is transferred to the gap in the conveyor rail, to be moved to the unloading point. In like manner, work to be processed is loaded on the conveyor and transferred by the segment to the processing machine. The two machines are interlocked in operation so that there is no movement of work in the vicinity of an unfilled gap in either rail.

The invention is fully disclosed by way of example in the following description and in the accompanying drawings in which.

Reference to these views will now be made by use of like characters which are employed to designate parts throughout.

Figure 1:
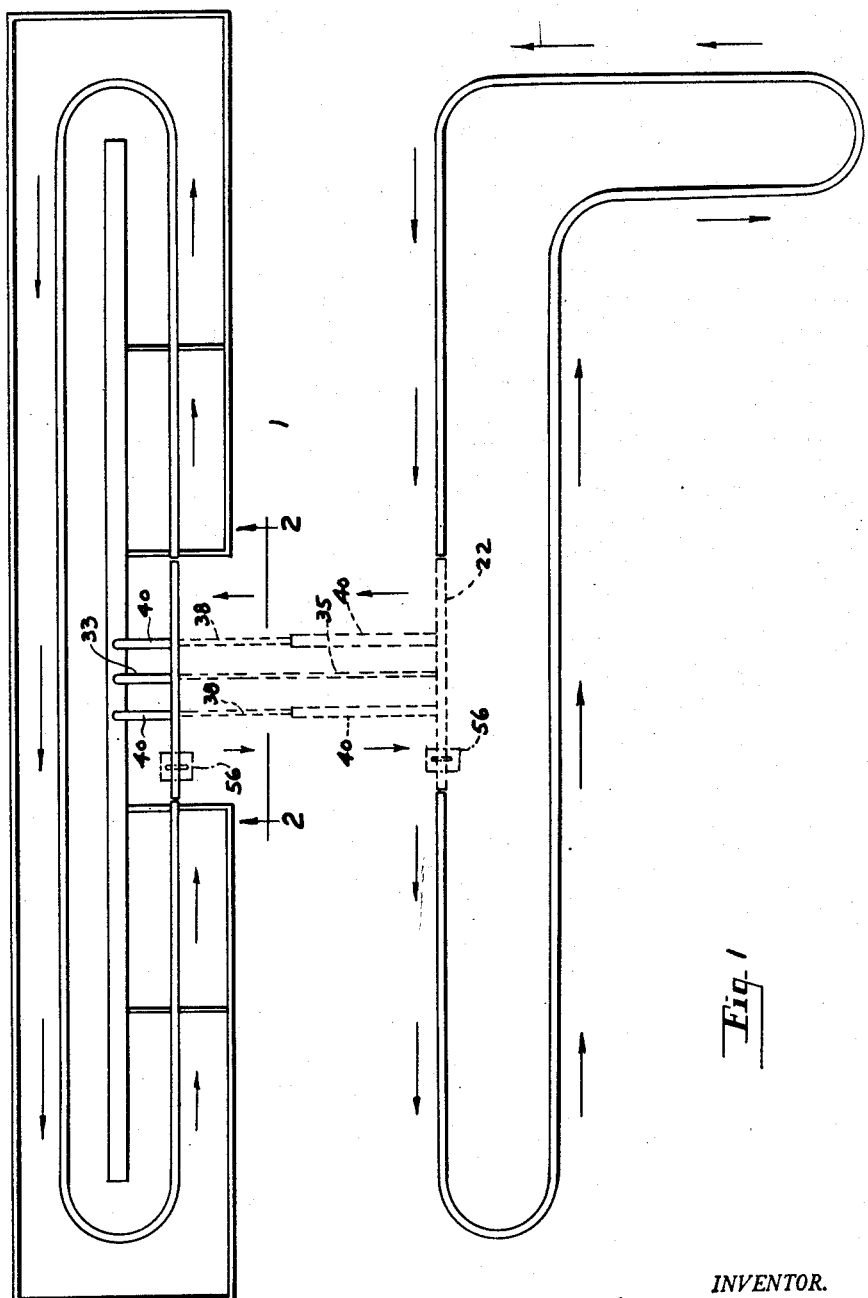
Figure 1 is a schematic plan view.

In Figure 1 is shown a series of plating tanks 1 incorporated in a plating machine as shown in Patent No. 2,479,322 or in my co-pending application Serial No. 755,365, filed June 18, 1947. Although these machines have endless conveyors, the invention is also applicable to straight line or open ended machines. The tank structure 1 is divided by partitions into a number of compartments for containing various solutions or baths in which the work is successively treated, as well known in the art. A rail 2 follows the series of compartments and carries a number of slidably mounted work carriers or hooks 3 which are moved intermittently along the rail by suitable means, for example as disclosed in the aforementioned patent or application.

The propelling mechanism here illustrated is similar to that shown in the co-pending application. A frame structure 4 embodies a longitudinal angle iron 5 to which is secured a series of spaced guides 6 having alined horizontal guide slots 7. A T-shaped bar 8, or a series of such bars, is mounted for oscillation in the slots 7. Pusher members 9 are fixed or pivotally attached to the member or members 8 and are positioned to abut the carriers 3. A pivotal mounting 10 is provided between a pusher 9 and its bar 8 in positions where the pusher must be retracted over a carrier into pushing position behind it. A suitable mechanism is provided for oscillating the bar or bars 8, as shown in the co-pending application.

The series of tanks 1 is interrupted by an open space or gap 20 which has approximately the length of three work carrier intervals. The rail 2 is also interrupted at this space, leaving a gap 21 which is filled at times by a displaceable rail segment 22 supported and moved by mechanism that will presently be described.

Although not essential to the present invention, the rail 2 may be divided into sections, some of which are carried by the frame section 4 and others fixed relatively to the tank structure. The frame structure 4 may be movable vertically to permit transfer of work carriers from one compartment to another along the rail sections carried by the frame structure 4. The mechanism for accomplishing these movements with the construction here illustrated is disclosed in the copending application. The structure of Patent No. 2,479,322 may also be used for this purpose if desired.

A longitudinal structural member 30 is laid in the bottom of the space 20 at the rearward portion thereof. On this member are mounted three alined bearings 31 which support a longitudinal shaft or rod 32. At the central bearing 31 is mounted the lower end of a hydraulic cylinder 33 by means of bearings 34 receiving the shaft 32 and straddling the bearing 31. Through the upper end of the cylinder extends a piston rod 35. An angle iron 36 extending lengthwise of the space 20 is secured to the upper end of the piston rod 35 by a pair of nuts 37.

At each side of the cylinder 33 is a telescopic tube having its inner section 38 attached at its lower end by means of a bearing 39 to the shaft 32 at the corresponding end bearing 31. The outer telescopic section 40 has its upper end welded to a face plate 41 fastened along the angle iron 36 by bolts 42 passed through vertical slots 43 in the plate 41 for vertical adjustment of the latter. A suitable number of laterally extending brackets 45 are secured to the plate 41. On the brackets are mounted pillow blocks 46 which carry the previously mentioned rail segment 22. Rollers 47 are mounted at the ends of the segment 22 for a purpose that will presently be described.

Figure 2:
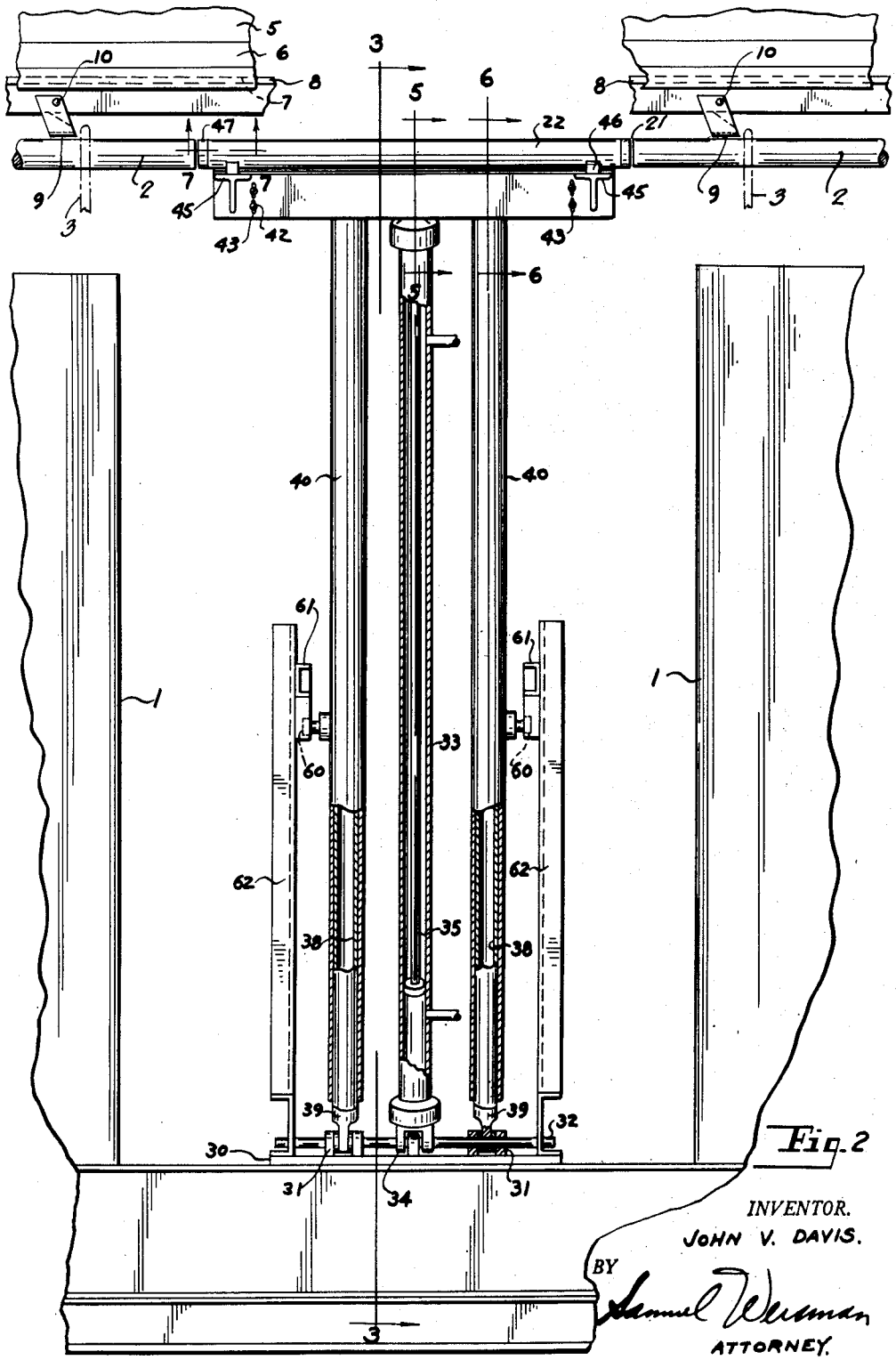
Figure 2 is a section on the line 2—2 of Figure 1.
Figure 7:
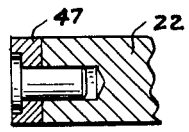
Figure 7 is a section on the line 7—7 of Figure 2.
Figure 3:
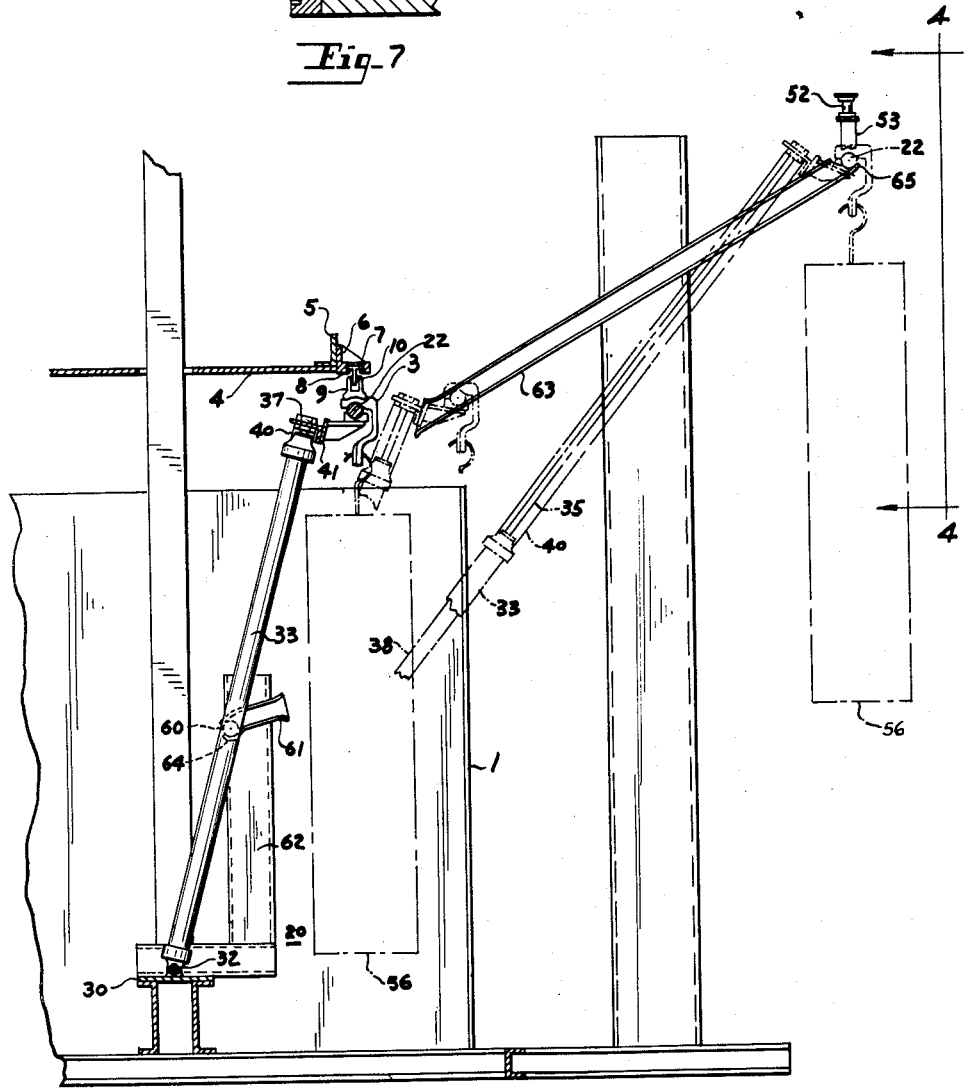
Figure 3 is a section on the line 3—3 of Figure 2.
Figure 4:
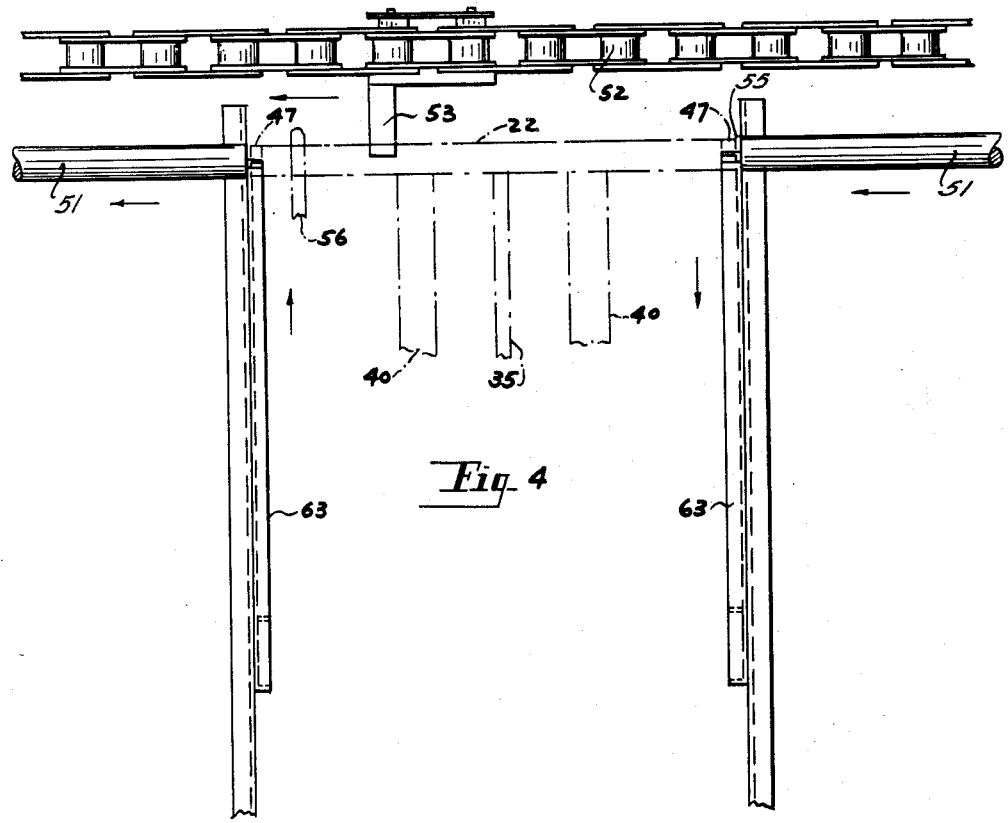
Figure 4 is a section on the line 4—4 of Figure 3.
Figures 5, 6:
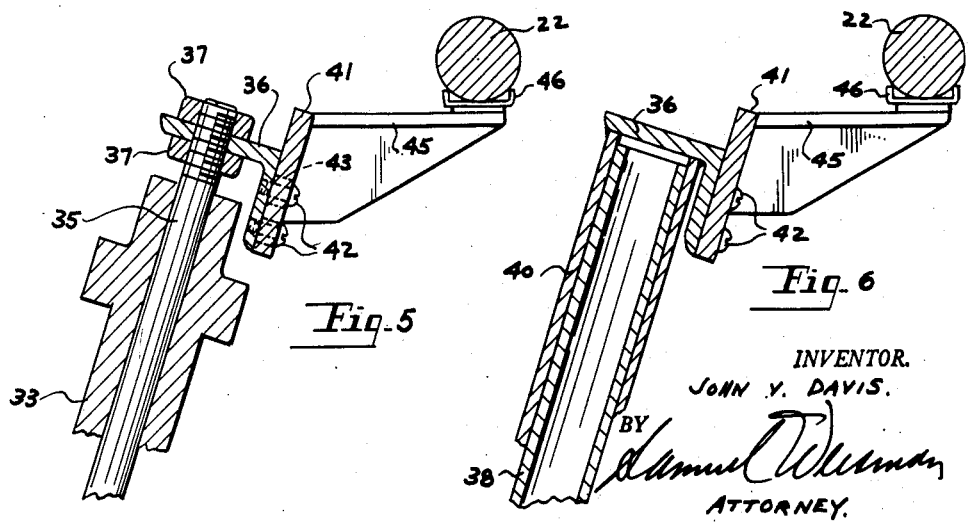
Figure 5 is a section on the line 5—5 of Figure 2.
Figure 6 is a section on the line 6—6 of Figure 2.

The segment 22 in moving from the full line position in Figure 3 to the adjacent lower end of the guide 63 describes an arc about the pivot 32 as a center, both ends of the arc being in the same horizontal plane. The initial vertical component of the arc, before clearing the pusher members 9, is very small. Ordinarily this component is not sufficient to interfere with the members 9 adjacent to the hooks 3. If such interference should occur, it would be accommodated by the pivotal movement of the members 9 on their pivots 10 shown in Figure 2.

It is evident from Figure 3 that the guide member 61 is clear of the path of the work piece 56. This relationship permits continuous movement of the carrier 3 along the machine rail 2 when there is to be no shifting to the conveyor rail 51, as may be desired to some cases.

It is also evident in Figure 3 and in the foregoing description that the segment 22 is first guided by the member 61 and then by the member 63 in being shifted from the machine to the conveyor. The horizontal space between the gap in the machine rail 2 and the nearer end of the guide member 63 permits unobstructed movement of the carrier 3 during continuous movement along the machine rail 2 with the segment 22 therein, as above described. In other words, such continuous movement of the work piece 56 and the carrier 3 is permitted by the unique construction of the guiding piece, wherein one portion of the guiding action is effected by the member 61 and another portion by the spaced member 63. In the first portion, the rollers 60 on the tubes 40 are guided in the rails 61, and in the other portion the segment 22 is guided directly in the rails 33. The pusher 9 engages the top of the hook 3, and the spacing of the rails 63 horizontally from the gap 20 or from the segment 22 in the position shown in Figure 3, permits the segment and hook thereon to be moved outward without interference by the pusher 9. Thereafter, the segment and hook are elevated by the rails 63 if the conveyor rail is higher, although the foregoing advantages are realized even if the conveyor rail is not higher. In the movement of the segment from the conveyor to the machine, the guiding is obviously reversed.

Adjacent to the tank structure 1 is a conveyor which includes a rail 51 similar to the tank rail 2. The rail 51 may be endless if desired and extends to suitable locations for loading and unloading as well as through stations for various treatments of the work, such as drying, painting, polishing and the like. The work is propelled intermittently along the rail by suitable means, illustrated here as a sprocket chain 52 co-extensive with the rail and carrying pushers 53 adapted to engage work carriers on the rail, as in Patent No. 2,479,322.

The conveyor rail 51 has a portion parallel and directly adjacent to that part of the rail 2 which has the gap 21. This portion has a gap 55 directly opposite the gap 21 and of the same length. The rail segment 22 is movable from the gap 21 to the gap 55 and vice versa.

The processing machine is loaded and unloaded by the conveyor 50 through the movement of the segment 22 carrying one or more work carriers 3. Work racks 56 are suspended from the latter in the usual manner. The rail segment 22 is displaced by a properly timed operation of the hydraulic cylinder 33, 35.

For the initial guiding of the segment 22 toward the conveyor, the sliding tube sections 40 carry rollers 60 received in inclined guide rails 61 which are secured to posts 62 mounted on the structural member 30. Another pair of guide rails 63 extends from the ends of the gap 21 to the ends of the gap 55 and receives the previously mentioned rollers 47. To maintain the terminal positions of the segment 22, the lower ends of the rails 61 are formed with stops 64 engaged by the rollers 60 through gravity, and the upper ends of the rails 63 are formed with stops 65 engaged by the rollers 47 through the pressure in the hydraulic cylinder. The pusher actuating mechanisms of both machines are interlocked electrically or mechanically so that neither can operate adjacent to an unfilled gap in the corresponding rail.

In the diagram shown in Figure 1, the conveyors of both machines are endless, moving in the same direction. Consequently the parts of the conveyors at the gaps move oppositely to one another, one part moving to the right and the other to the left, as indicated by the arrows. A peculiar result is obtained by reason of these opposite motions. Let it be assumed that the conveyor moves from right to left at the portion 54, bringing the work onto the right-hand end of the segment 22 while in the gap 55. Before the work carrier reaches the point at which the hydraulic cylinder is attached to the segment 22, the segment is shifted to the gap 21 of the processing machine rail. At the gap 21 the work in the processing machine moves from left to right, as already indicated, so that the work carrier rides off the same or right-hand end of the segment 22. Similarly, when the work comes around to the left-hand end of the segment 22 while in the processing machine, the segment is shifted to the conveyor and moved off the same or left-hand end of the segment.

Thus, the intermediate portion of the segment 22, where it is supported by the hydraulic cylinder, is not traversed by the work carriers, and there is no interference between the suspended work and the hydraulic cylinder. Otherwise, if the point of support were traversed by the work carriers, a complicated construction would be necessary to provide a clearance between the moving work and the supporting hydraulic cylinder. For the disclosed mode of operation, the ends of the segment 22 overhang or extend beyond the telescopic members 40 sufficiently to receive the work on and discharge it from these overhanging ends.

Although a specific embodiment of the invention has been illustrated and described, it will be understood that various alterations in the details of construction may be made without departing from the scope of the invention as indicated by the appended claims.

What I claim is:

1. In a loading and unloading apparatus, a processing machine including a rail, a conveyor laterally adjacent to said machine and also including a rail, two series of spaced and timed work pushers associated respectively with said rails, said rails having respectively parallel portions with a gap in each such portion, said gaps being directly opposite each other and of equal length, a rail segment adapted to fit selectively in said gaps, a carrying member supporting said segment, a guide member between said machine and the gap in the conveyor rail, the end of said guide member nearer said machine being spaced laterally from the gap in the machine rail, another guide member fixed relatively to said machine and positioned laterally from the path of work suspended from said machine rail and on the side more remote from said conveyor, a slide member carried by said carrying member and slidable in the second guide member, the second guide member being shaped to guide said segment from the gap in the machine rail into the nearer end of the first guide member and vice versa.

2. The combination set forth in claim 1, further characterized by the work pushers for the machine rail being above said rail, the second guide member having a small angle of elevation toward the conveyor, whereby initial movement of said segment from said machine rail is effected without interference by said pusher assembly.

3. The combination set forth in claim 1, further characterized by a work carrier hook suspended from the machine rail on the side thereof nearer the first guide member, whereby the second guide member does not interfere with the movement of the hook.

4. The combination set forth in claim 1, further characterized by a work carrier hook suspended from the machine rail on the side thereof nearer the first guide member, the work pushers for the machine rail being above said rail, whereby said second guide member does not interfere with the movement of said hook, the second guide member having a small angle of elevation toward the conveyor, whereby initial movement of said segment from said machine rail is effected without interference by said pusher assembly.

5. The combination set forth in claim 1, wherein said carrying member is a pivoted extensible structure.

6. In a loading and unloading apparatus, a processing machine including an alined series of receptacles, said series being interrupted by an intermediate open space, said machine including a rail, a conveyor laterally adjacent to said machine and also including a rail, two series of spaced and timed work pushers associated respectively with said rails, said rails having respectively parallel portions with a gap in each such portion, said gaps being directly opposite each other and of equal length, the gap in the first rail being located at said space, a rail segment adapted to fit selectively in said gaps, a carrying member supporting said segment, a guide member between said machine and the gap in the conveyor rail, the end of said guide member nearer said machine being spaced laterally from the gap in the machine rail, another guide member fixed relatively to said machine and positioned laterally from the path of work suspended from said machine rail and on the side more remote from said conveyor, a slide member carried by said carrying member and slidable in the second guide member, the second guide member being shaped to guide said segment from the gap in the machine rail into the nearer end of the first guide member and vice versa.

7. The combination set forth in claim 1, wherein the conveyor rail is at a higher elevation than the machine rail.

8. The combination set forth in claim 1, wherein said carrying member is an extensible fluid-operated device carrying said segment and adapted to move it from either gap to the other.

9. The combination set forth in claim 1, wherein said carrying member is disposed below said segment and attached to an intermediate point thereof.

JOHN V. DAVIS.

References Cited in the file of this patent

UNITED STATES PATENTS

| Number | Name | Date |
|---|---|---|
| 1,053,667 | Steedman | Feb. 18, 1913 |
| 1,620,120 | Morshead et al. | Mar. 8, 1927 |
| 1,841,640 | Schmidt et al. | Jan. 19, 1932 |
| 2,048,937 | Larson | July 28, 1936 |
| 2,116,430 | Gordon | May 3, 1938 |
| 2,360,836 | Leopold | Oct. 24, 1944 |